(12) United States Patent
Deakin

(10) Patent No.: US 6,463,275 B1
(45) Date of Patent: Oct. 8, 2002

(54) SYSTEM AND METHOD FOR BILLING IN A RADIO TELECOMMUNICATIONS NETWORK

(75) Inventor: Ian Andrew Deakin, Cronody (IE)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/494,883

(22) Filed: Jan. 31, 2000

(30) Foreign Application Priority Data

May 12, 1999 (GB) .............................................. 9911048

(51) Int. Cl.[7] .............................................. H04M 11/00
(52) U.S. Cl. ........................ 455/406; 455/432; 455/408; 455/409
(58) Field of Search ................................. 455/432, 433, 455/406, 408, 409; 379/126, 127.01, 127.02, 127.03, 127.04, 127.05, 115.01, 115.02

(56) References Cited

U.S. PATENT DOCUMENTS

| 5,732,127 A | * | 3/1998 | Hayes | ........................ 379/115 |
|---|---|---|---|---|
| 5,873,030 A | * | 2/1999 | Mechling et al. | ............ 455/408 |
| 5,875,238 A | * | 2/1999 | Glitho et al. | ................ 375/116 |
| 6,070,076 A | * | 5/2000 | Valentine | ..................... 455/445 |
| 6,173,171 B1 | * | 1/2001 | Plush et al. | .................. 455/408 |
| 6,208,720 B1 | * | 3/2001 | Curtis et al. | ................. 379/114 |

FOREIGN PATENT DOCUMENTS

| GB | 2246051 A | 1/1992 |
|---|---|---|
| GB | 2249920 A | 5/1992 |
| GB | 2332337 A | 6/1999 |
| WO | WO98/21874 | 5/1998 |
| WO | WO98/34393 | 8/1998 |

* cited by examiner

Primary Examiner—Daniel Hunter
Assistant Examiner—Lana Le
(74) Attorney, Agent, or Firm—L. Bruce Terry; Jeffrey K. Jacobs

(57) ABSTRACT

A system (FIG. 2) and method for billing in a radio telecommunications network, comprising:
means (HLR) for storing billing class identifier information associated with a predetermined subscriber or subscriber services; and charging gateway means for receiving call information together with the relevant billing class identifier information and for passing the call information to a relevant billing system.

4 Claims, 5 Drawing Sheets

SYSTEM AND METHOD FOR BILLING IN A RADIO TELECOMMUNICATIONS NETWORK

FIELD OF INVENTION

This invention relates to billing in radio telecommunications networks, e.g., in cellular telephone networks.

BACKGROUND OF THE INVENTION

In current cellular telephone networks all billing is provided by a centralised system. As these systems are large, processing huge amounts of data, it is impractical for them to provide Hot Billing (i.e., real-time billing) or Pre-paid Services. It would generally take these systems hours or even days to provide a statement for a subscriber. For this reason, operators have implemented proprietary systems to provide these services. These proprietary solutions usually employ the use of intelligent network (IN) systems, which are very expensive and slow to deploy. Also, as these systems are proprietary, they do not allow roaming for the subscriber.

SUMMARY OF INVENTION

In accordance with a first aspect of the present invention there is provided a system as claimed in claim 1.

In accordance with a second aspect of the present invention there is provided a method as claimed in claim 4.

BRIEF DESCRIPTION OF DRAWINGS

A variety of embodiments of the invention will now be described with reference to the accompanying drawings, in which.

DESCRIPTION OF PREFERRED EMBODIMENT

Figure 1:
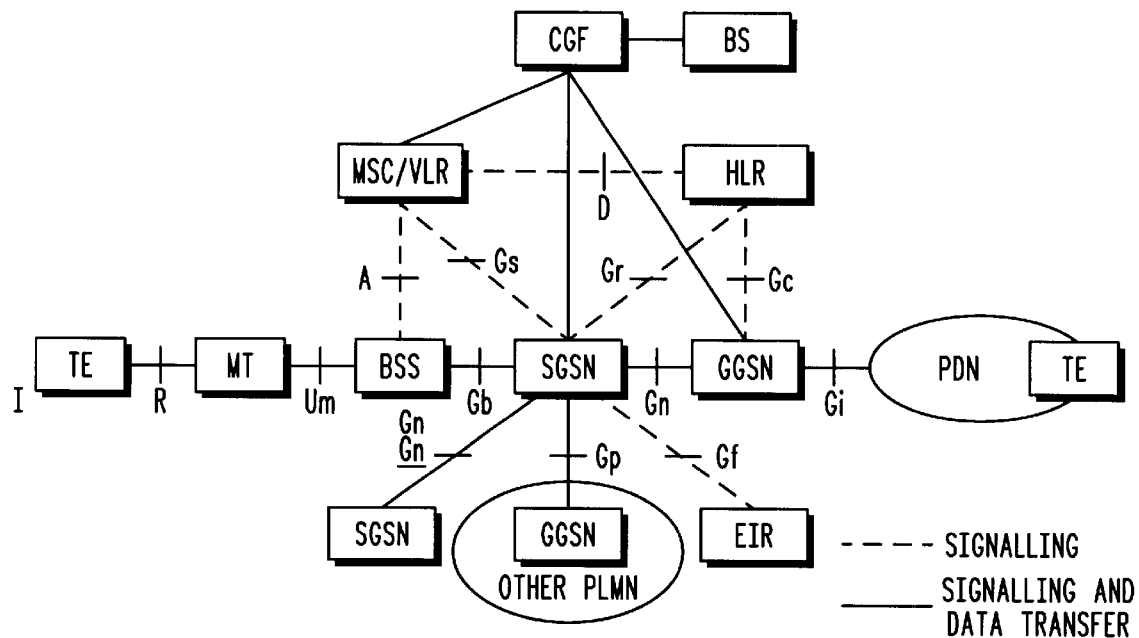
FIG. 1 shows a schematic block diagram of the logical architecture of a GSM/GPRS cellular telephone network.

The examples used in the following description are based on a GSM/GPRS network. It will be understood that the Network Elements within the GSM/GPRS network that are capable of generating Call Detail Records (CDR's) are the Master Switch Controller (MSC), the Serving GPRS Support Node (SGSN) and the Gateway GPRS Support Node (GGSN).

As will be described, the Charging Gateway (CG) provides a mechanism to transfer charging information from the SGSN and GGSN nodes to the network operator's chosen Billing Systems (BS). The Charging Gateway is able to provide the routing of CDR's to a Billing System based on the Billing Class Identifier (BCI)—to be described below—for those Network Elements that do not provide this functionality.

In the following description, for simplicity and in order to avoid repetition, the following abbreviations are used:

| | |
|---|---|
| BCI | Billing Class Identifier |
| BG | Border Gateway |
| BS | Billing System |
| CDR | Call Detail Record |
| CG | Charging Gateway |
| CGF | Charging Gateway Functionality |
| GGSN | Gateway GPRS Support Node |
| GPRS | General Packet Radio Service |
| G-CDR | Gateway GPRS Support Node - Call Detail Record |
| HLR | Home Location Register |
| MS | Mobile Station |
| NE | Network Element |
| PDN | Packet Data Network |
| PLMN | Public Land Mobile Network |
| PSTN | Public Switched Telephone Network |
| SGSN | Serving GPRS Support Node |
| S-CDR | Serving GPRS Support Node - Call Detail Record |

The present invention is based on the principle that for each subscriber, and services allocated to that subscriber, a billing class identifier is allocated. The mobile network nodes recording the call event data for a subscriber will typically use this billing class information to pass all relevant data required to bill that subscriber for the service to the appropriate billing system for processing.

Typically, within a Mobile Communications Network each subscriber will have a database entry within a HLR. The HLR database entry details information for each subscriber about permissions, access writes, connection status, etc.

Typically the BCI can be implemented as a new parameter within the HLR. The new BCI parameter can be assigned to either the basic services or supplementary services. The Billing Class Identifier can be used by the Mobile network to route the Call Event Data for a subscriber or individual service of a subscriber to the correct billing system for processing.

The billing systems can be distributed and provide specific functionality to support the billing type, i.e. Hot Billing, Pre-Paid, Normal. The data could also be routed to a billing system of another operator to allow subscriber roaming of Pre-paid and Hot billing. Today all Call event data must be sent to a central system for post processing, to determine the type of charging which should be applied; this is slow and costly.

Utilising the present invention, all call event data can be tagged at source, allowing all data to be routed to the correct billing system for immediate processing; this can be fast, flexible and low-priced.

Thus the present invention can provide a number of benefits:

The operator is able to support the following billing service types to the subscriber which previously could not be supported.
1. Hot Billing: e.g., hire cars can all have mobile phones in them. When the car is returned the bill for the mobile phone can be available immediately.
2. Pre-paid Roaming: it is possible to hire a phone in one country and use it in many other countries before returning the phone.

The billing system servers used to support these applications can be computers, which are significantly cheaper than the previous IN based solutions, and easier and faster to deploy.

The operator could have regionally distributed billing systems instead of centralised. This would spread the load and provide resilience.

Roaming is possible for Hot Billing and Pre-Paid services. The subscriber will benefit from the fact that all these billing services are available even if he roams in to another network.

Individual subscriber services can be billed in different ways, e.g., a subscriber's GSM circuit switch can be normal billing and GPRS can be Pre-Paid.

Referring now to the drawings, FIG. 1 shows the logical architecture of a GSM/GPRS network. In such a network a billing system BS is linked via charging gateway functionality (CGF) to the master switching centre (MSC), serving GPRS support node (SGSN) and gateway GPRS support node (GGSN). A home location register (HLR) is linked to the GGSN and the MSC. The MSC is linked to base stations switches (BSS), and GGSNs are connected to packet networks and to other public land mobile networks (PLMN).

Figure 2:
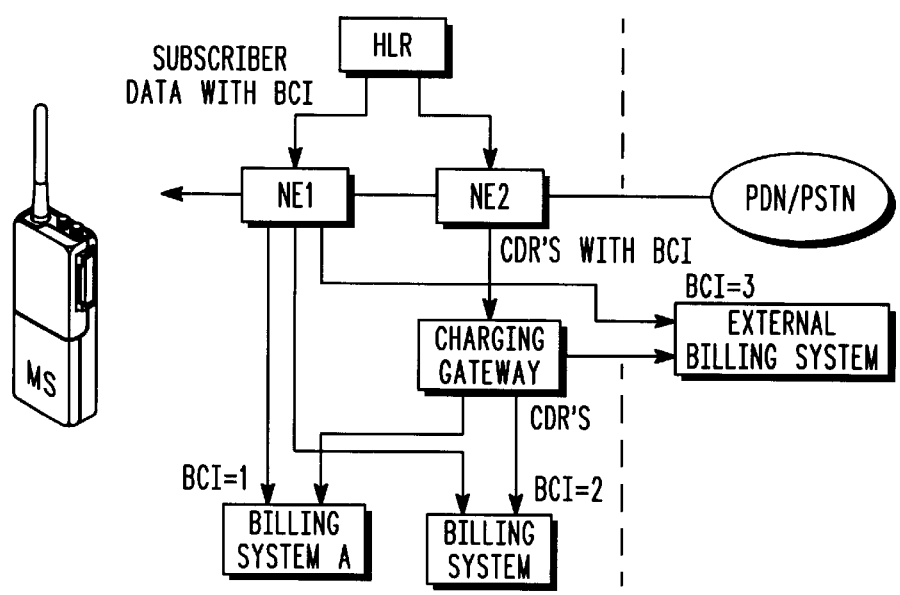
FIG. 2 shows a schematic block diagram of a charging architecture using BCI.

The diagram in FIG. 2 shows the basic architecture of a CDR (Call Detail Record) generating Network Element and Charging Gateway using the BCI to route CDR's to the appropriate billing system for processing. A billing system could be an external system in the case of roaming. Using the architecture of FIG. 2, a home location register (HLR) is linked to network elements (NE1 and NE2), which are in turn linked to mobile stations (MS) and to an external packet data network (PDN) and public switched telephone network (PSTN). The network element NE2 passes call detail records (CDRs) with billing class identifiers (BCI) to a charging gateway, which directs CDRs having appropriate billing class identifiers (in this example with BCIs of 1, 2 and 3) to respective billing systems (shown as A, B and C).

The network element NE1 passes billing information to the relevant billing system A, B and C.

Figure 3:
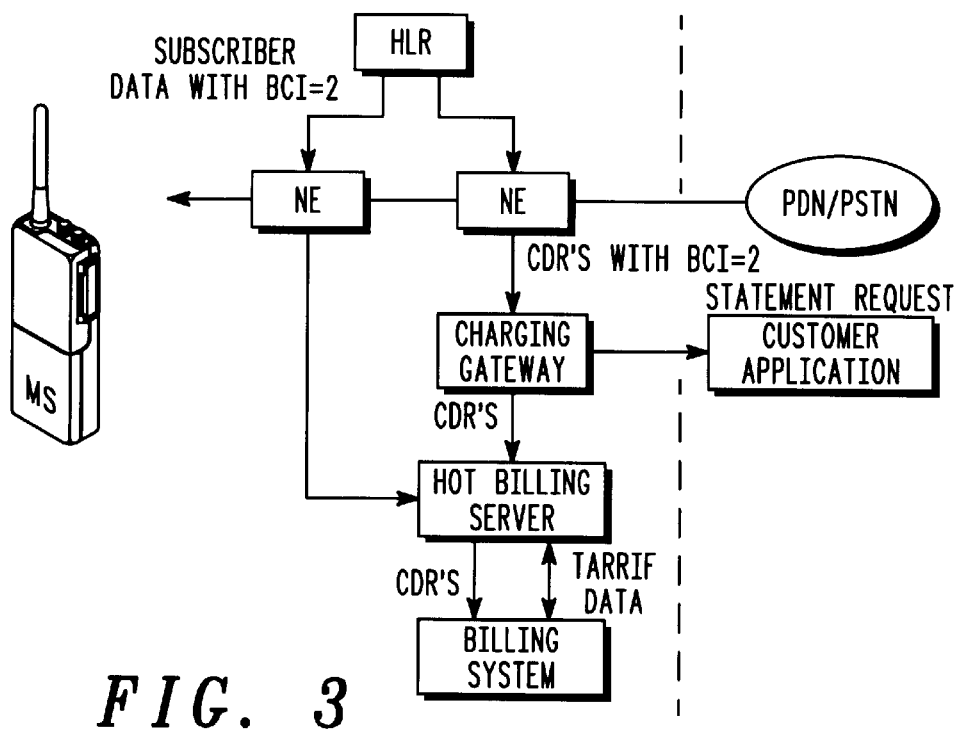
FIG. 3 shows a schematic block diagram of a possible architecture for a Hot Billing Server using the BCI to route the Call Event Data.

For Hot Billing the Call Event Data would need to be made available to a billing application within a very short period of time. Typically in GSM this time period would be less than 5 minutes of the end of a call. The diagram in FIG. 3 shows the possible architecture for a Hot Billing Server using the BCI to route the Call Event Data. As shown, in this architecture a hot billing server receives relevant CDRs (e.g., with BCI of 2) from a charging gateway. The hot billing server passes CDRs to a billing system, with which it communicates tarrif data. The hot billing server also communicates with for statement requests.

Figure 4:
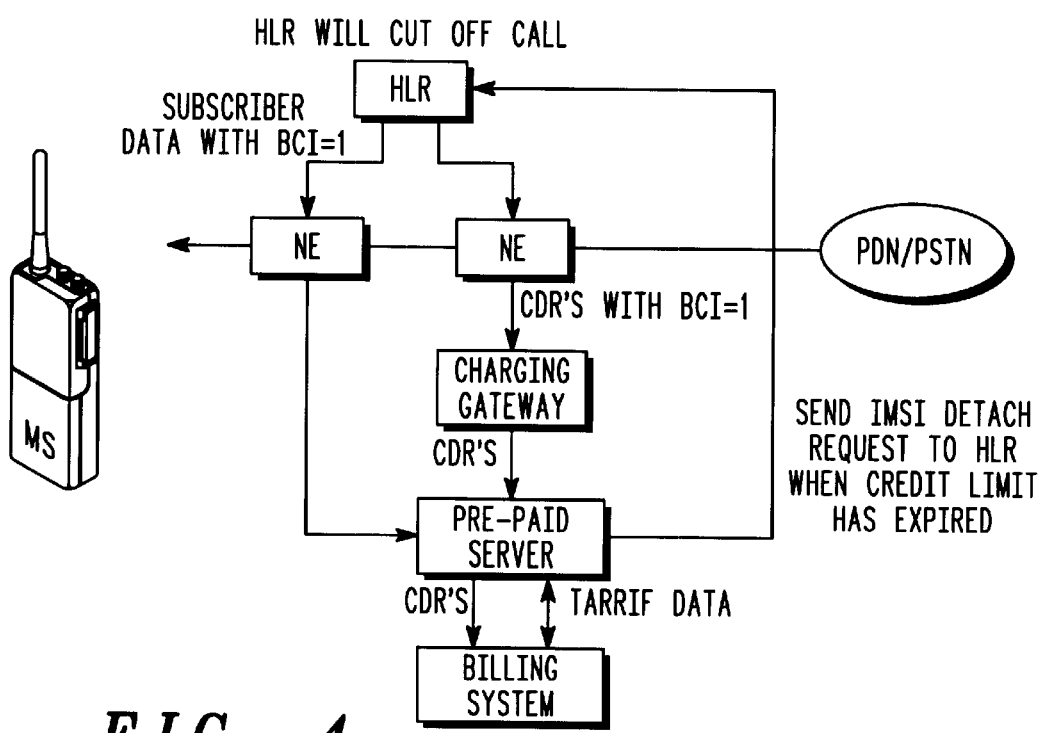
FIG. 4 shows a schematic block diagram of a possible architecture for Pre-Paid Billing (applicable to GPRS)

For Pre-Paid billing, the Call Event Data would need to be made available to a billing application within a very short period of time. The diagram in FIG. 4 shows the possible architecture for a Pre-Paid Server using the BCI to route the Call Event Data. The Pre-Paid server is responsible for accounting the subscriber call in real time and when the subscribers credit limit has expired. As shown, in this architecture a pre-paid server receives relevant CDRs (e.g., with BCI of 1) from a charging gateway. The pre-paid server passes CDRs to a billing system, with which it communicates tarrif data. In the event that a subscriber's credit limit is exceeded, the pre-paid server sends a 'IMSI Detach Request' signal to the home location register (HLR) which will cut off the call.

Figure 5:
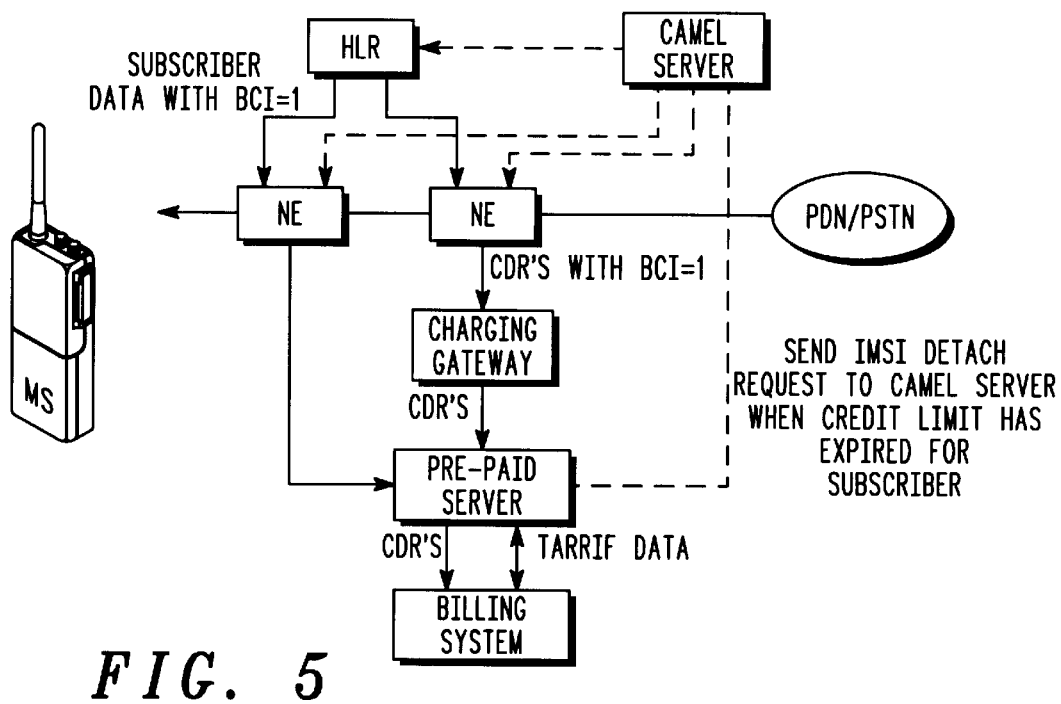
FIG. 5 shows a schematic block diagram of a possible architecture for Pre-Paid Billing for GSM Using 'CAMEL'.

Referring now to FIG. 5, with the introduction of 'CAMEL' services in GSM this will allow a consistent mechanism to keep track of the currently active services, whether the subscriber is in there own network or roaming in another network. In this architecture (similar to the pre-paid billing architecture of FIG. 4), as shown, the Pre-Paid server is responsible for accounting the subscriber call in real time, and when the subscriber's credit limit has expired it will send a signalling message to the CAMEL server to detach the services for that subscriber. The CAMEL server will send out an 'Immediate service termination' for that service or all services for the subscriber.

Figure 6:
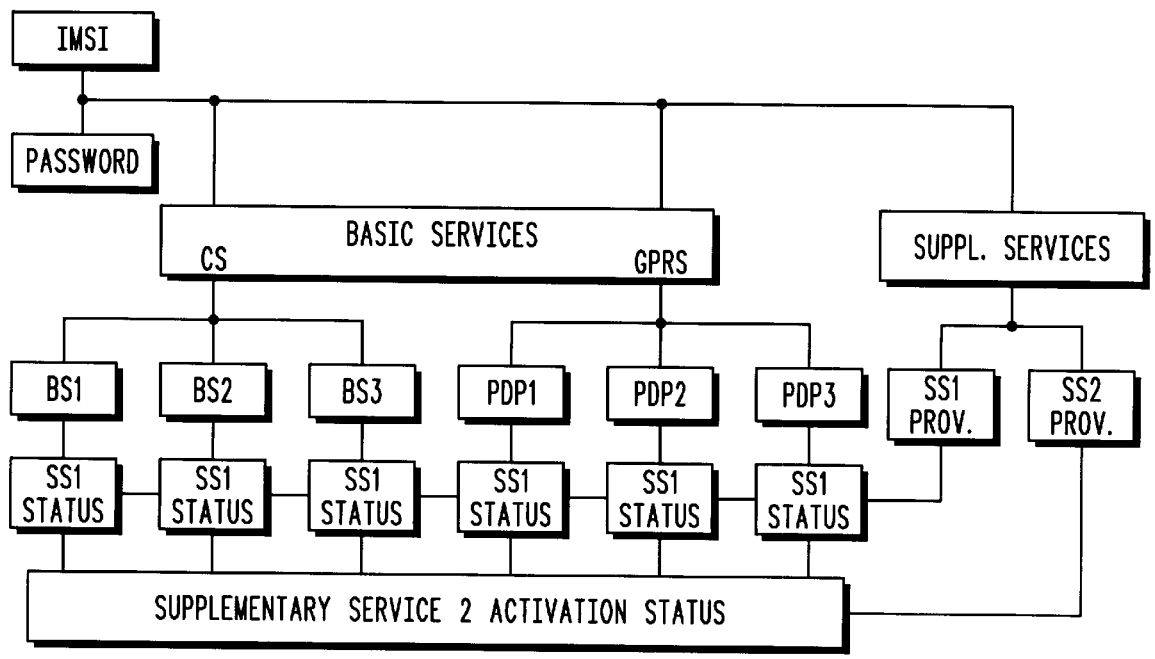
FIG. 6 shows a schematic block diagram depicting a system storing of GPRS Subscription Data.

IMSI is the prime key to the GSM/GPRS subscription data stored in the HLR. There may be several sets of GPRS subscription data per IMSI. This is illustrated in FIG. 6.

The new parameter included in accordance with this invention is a Billing Class Identifier (BCI), which can be assigned to either the basic services or supplementary services. This is to allow each of the subscriber services be allocated different charging principals. The following table shows Billing Class Identifier (BCI) subscription data contained in the HLR.

| Field | Description |
| --- | --- |
| Billing Class Identifier | The Billing Class identifier allocated to this subscriber used by the GSN's and CG, used for routing Call Event Data to the appropriate Billing System. |

The following table shows, by way of example only, Billing Class Identifier (BCI) values. The BCI may conveniently be a binary encoded octet parameter, giving a range of Billing Class identifier values from 1 to 127. The most significant bit may be set if the CDR records are to be used for subscriber trace.

| Billing Class Identifier | Description |
| --- | --- |
| 1 | Indicates that the data for this subscriber is Pre-Paid. |
| 2 | Indicates that the data for this subscriber is Hot Billing. |
| 3 | Indicates that this data can be processed as normal. |
| 4–127 | Reserved for operator use. |
| 128 | Reserved for Subscriber Trace. 128 is added to the billing class. Where x is the billing class indicator. For example, see the following description in relation to FIG. 8. |
| X = '1xxxxxxx' | |

Figure 7:
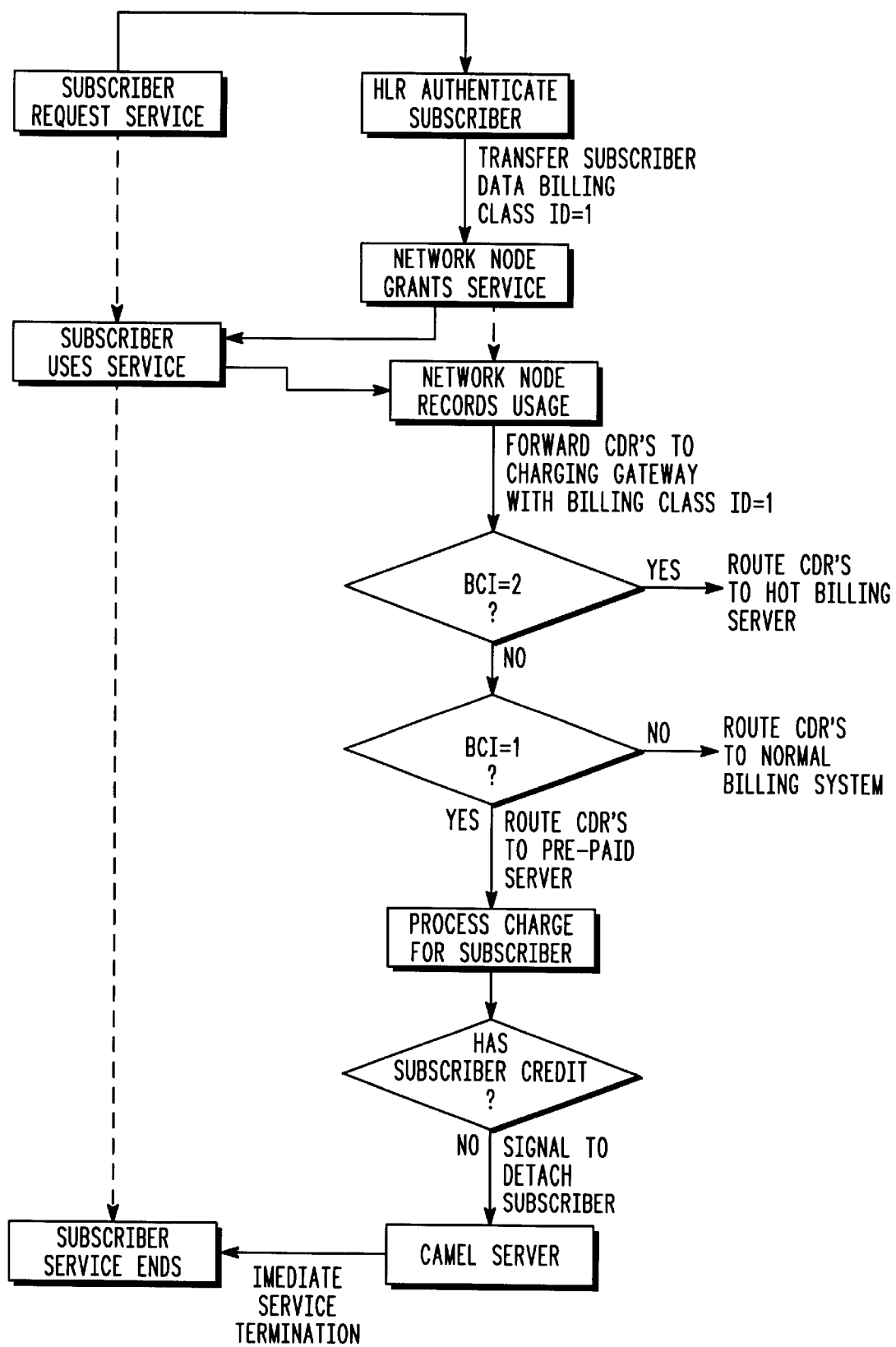
FIG. 7 shows a schematic block diagram depicting an Example of a Pre-Paid Billing Process.

The diagram in FIG. 7 shows the process and information exchange for a subscriber that has a GSM service that is using a Pre-Paid account.

Figure 8:
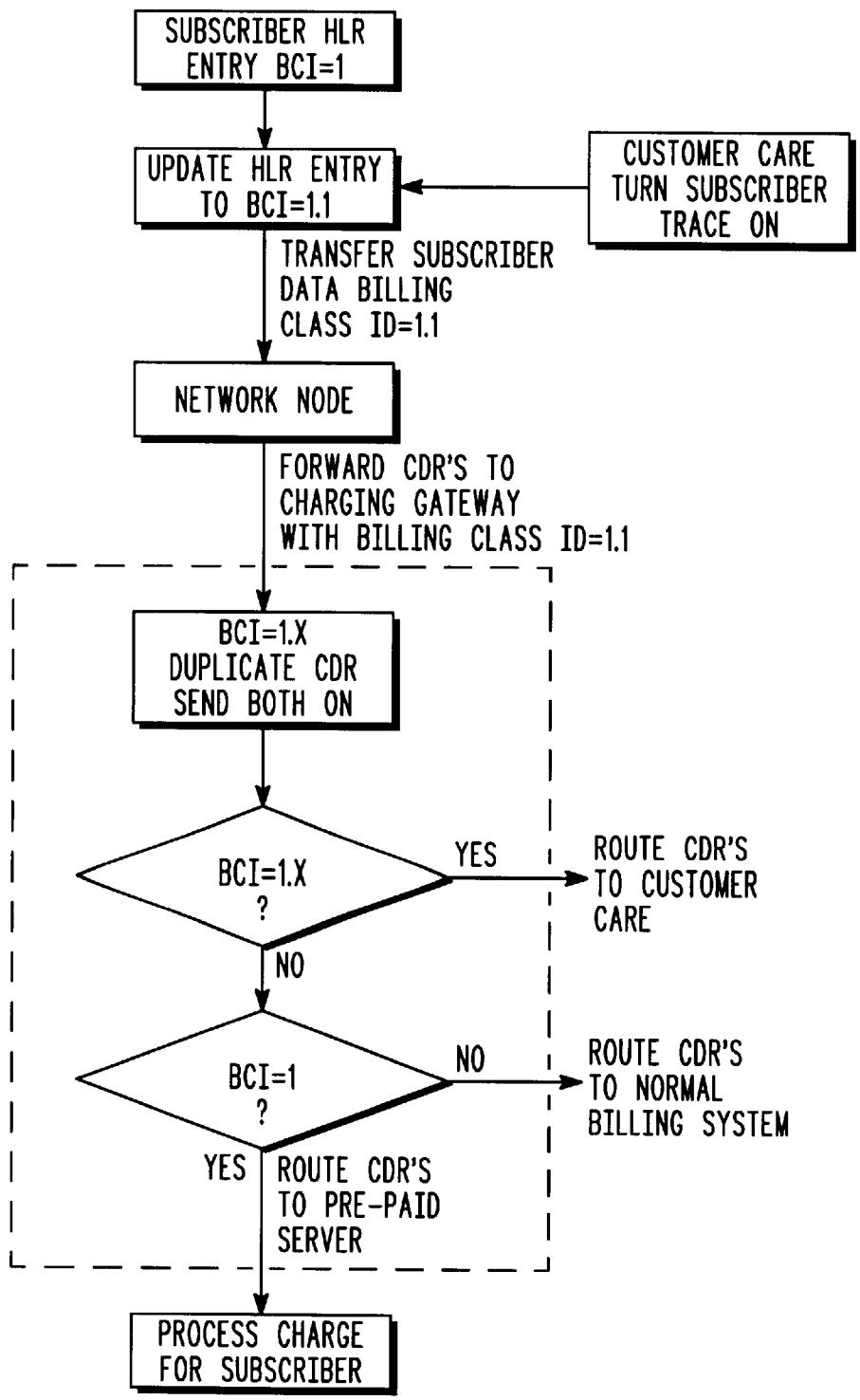
FIG. 8 shows a schematic block diagram depicting a Subscriber CDR Trace Process.

Referring now to FIG. 8, the BCI can be used to instruct the charging gateway to send copies of the CDR's to a Customer Care or Organisation and Management (O&M) system for the purpose of tracing a subscriber's events. The BCI is flagged with a binary indicator added to the original BCI for the subscriber in the HLR. This can be configured via O&M by Customer Care or an O&M crafts person. When The charging gateway functionality node (CGF) receives CDR's with the binary indicator set, it will first duplicate the CDR without the binary indicator set and send both records (original and un-set duplicate) to the routing process.

I claim:

1. A system for billing in a radio telecommunications network, comprising:

means for storing billing class identifier information associated with a predetermined subscriber or subscriber services, the billing class identifier capable of identifying a relevant billing system out of a plurality of billing systems common for a plurality of calls; and charging gateway means for receiving call information related to a call from the predetermined subscriber, for receiving the relevant billing class identifier information from the storing means and for passing the call information to the relevant billing system identified by the billing class identifier.

2. A system as claimed in claim 1 further comprising hot-billing server means for receiving the call information from the charging gateway means for providing hot-billing services.

3. A system as claimed in claim 1 further comprising pre-paid server means for receiving the call information from the charging gateway means for providing pre-paid services.

4. A method of billing in a radio telecommunications network, comprising the steps of:

storing billing class identifier information associated with a predetermined subscriber or subscriber services and capable of identifying a relevant billing system out of a plurality of billing systems common for a plurality of calls; and in charging gateway means receiving call information related to a call from the predetermined subscriber, receiving the relevant billing class identifier information and for gating the call information to the relevant billing system identified by the billing class identifier.

* * * * *